United States Patent [19]

Coon et al.

[11] 4,248,825

[45] Feb. 3, 1981

[54] SULFUR PROCESSING RELEASE AGENTS

[75] Inventors: Delbert L. Coon; Harry M. Schiefer, both of Midland, Mich.

[73] Assignee: Dow Corning Corporation, Midland, Mich.

[21] Appl. No.: 5,949

[22] Filed: Jan. 24, 1979

[51] Int. Cl.$^3$ .............................................. B29D 7/02
[52] U.S. Cl. .................................... 264/213; 106/38.2; 106/287.13; 106/287.14; 260/37 SB; 260/33.6 SB; 525/475; 528/17; 528/33; 528/41
[58] Field of Search ........................ 525/475; 264/213; 106/38.2, 287.13, 287.14; 260/37 SB, 33.6 SB; 528/17, 33, 41

[56] References Cited

U.S. PATENT DOCUMENTS

| | | | |
|---|---|---|---|
| 3,047,528 | 7/1962 | Bluestein | 528/18 X |
| 3,684,756 | 8/1972 | Brooks | 525/475 X |
| 3,819,793 | 6/1974 | Elliott | 264/213 |
| 3,922,246 | 11/1975 | Ceyzeriat et al. | 525/475 X |
| 4,011,362 | 3/1977 | Stewart | 428/457 |
| 4,076,695 | 2/1978 | Keil | 528/48 X |
| 4,100,129 | 7/1978 | Beers | 525/475 X |
| 4,101,686 | 7/1978 | Strella et al. | 427/22 |

*Primary Examiner*—Melvyn I. Marquis
*Attorney, Agent, or Firm*—Jack E. Moermond

[57] ABSTRACT

Release agents which are durable when used in the release of sulfur during its processing are claimed. Methods of processing sulfur using the release agents are also claimed. One release agent consists essentially of certain carboxy functional siloxanes, a solvent, and certain titanates. Another release agent consists essentially of a polydimethylsiloxane fluid, a siloxane composed of $SiO_2$ and $(CH_3)_3SiO_{1/2}$ units, a solvent, and a titanate. A third release agent consists essentially of certain carboxy functional siloxanes, a polydimethylsiloxane fluid, a siloxane composed of $SiO_2$ and $(CH_3)_3SiO_{1/2}$ units, a solvent, and certain titanates.

22 Claims, No Drawings

4,248,825

SULFUR PROCESSING RELEASE AGENTS

BACKGROUND OF THE INVENTION

One of the significant sources of sulfur is as a by-product of sour gas refining. In the processing of such sulfur it is commonly placed in molten form on a metal belt where it is cooled to form a "slate" about $\frac{1}{4}$ to $\frac{3}{8}$ inch thick, which slate is subsequently broken into chunks for ease of handling and shipping. Problems occur in releasing the sulfur from the metal substrate. Thus there exists a need in the sulfur processing art for a release agent, preferably one with a reasonable degree of durability on the metal substrate. Moreover, if such a release agent were found, it would have utility in processing the sulfur into "bar" or other solid forms which involve the release from metal substrates.

In U.S. Pat. No. 4,011,362 it is disclosed that certain carboxy functional siloxane fluids alone or in combination with a trimethylsiloxy endblocked polydimethylsiloxane fluid can be applied to metal substrates to improve their release characteristics. It is particularly suggested that the invention has utility in treating metal fuser rolls in duplicating machines; and the release of nylon from a metal substrate is shown. A similar disclosure can be found in U.S. Patent Applications Ser. Nos. 491,432 now abandoned and 491,415 filed on July 24, 1976, now U.S. Pat. No. 4,101,686 copies of said applications having been filed as priority documents with Dutch Patent Application No. 7506978.

In U.S. Pat. No. 4,076,695 it is disclosed that when certain carboxy functional siloxane fluids are incorporated in a polyurethane composition used in a reaction injection molding process that better release of the molded part can be achieved.

In U.S. Pat. No. 3,047,528 it is disclosed that a composition comprising certain carboxy functional siloxanes, certain fillers, and a polyvalent metal compound curing agent can be cured, by heating, into an elastomeric or rubbery product useful in forming gaskets, insulating electrical conductors, or encapsulating electrical components. Titanium is disclosed as one of seventeen suitable polyvalent metals, with the compound tetrabutyl titanate being specifically disclosed.

DESCRIPTION OF THE INVENTION

This invention relates to an improvement in the processes for processing sulfur which processes include the steps of placing molten sulfur on a metal substrate, cooling the molten sulfur to solid sulfur, and subsequently releasing the solidified sulfur from the metal substrate, said improvement comprising, prior to the time the molten sulfur is placed on the metal substrate, placing on the metal substrate one of the three compositions specified below and then drying said composition on the metal substrate, whereby the release of the solidified sulfur from the metal substrate is facilitated.

One composition which can be employed in the above process consists essentially of (1) 15 to 70 (preferably 40 to 60) percent by weight of a carboxy functional siloxane fluid having the general formula $(CH_3)_3SiO\{(CH_3)_2SiO\}_x\{(CH_3)RSiO\}_ySi(CH_3)_3$ wherein R is a carboxy functional radical attached to the silicon atom by an Si—C bond, x has an average value of from 25 to 400, and y has an average value of from 2 to 25, (2) from 0.1 to 5 (preferably 0.25 to 0.75) percent by weight of a titanate having the general formula $Ti(OR')_4$ wherein R' is an aliphatic hydrocarbon or a hydroxylated aliphatic hydrocarbon radical containing from 1 to 12 carbon atoms, and (3) from 25 to 80 (preferably 40 to 60) percent by weight of a solvent.

Another composition which can be employed in the above process consists essentially of (A) 70 to 85 (preferably 75 to 80) percent by weight of a trimethylsilyl endblocked polydimethylsiloxane fluid having a viscosity in the range of 20 to 100,000 centistokes at 25° C., (B) 5 to 15 (preferably 9 to 12) percent by weight of a siloxane composed of $SiO_2$ units and $(CH_3)_3SiO_\frac{1}{2}$ units wherein the ratio of the $SiO_2$ units to the $(CH_3)_3SiO_\frac{1}{2}$ units is in the range of 1:0.6 to 1:1.2, (C) 3 to 20 (preferably 8 to 12) percent by weight of a solvent in which (B) is soluble, and (D) 0.1 to 10 (preferably 0.2 to 0.5) percent by weight of a titanate having the general formula $Ti(OR')_4$ wherein R' is an aliphatic hydrocarbon or a hydroxylated aliphatic hydrocarbon radical containing from 1 to 12 carbon atoms.

A third composition which can be used in the above process consists essentially of (I) 15 to 40 (preferably 30 to 35) percent by weight of a carboxy functional siloxane fluid having the general formula $(CH_3)_3SiO\{(CH_3)_2SiO\}_x\{(CH_3)RSiO\}_ySi(CH_3)_3$ wherein R is a carboxy functional radical attached to the silicon atom by an Si—C bond, x has an average value of from 25 to 400, and y has an average value of from 2 to 25, (II) 10 to 35 (preferably 20 to 30) percent by weight of a trimethylsilyl endblocked polydimethylsiloxane fluid having a viscosity in the range of 20 to 100,000 centistokes at 25° C., (III) 2 to 5 (preferably 3 to 4) percent by weight of a siloxane composed of $SiO_2$ units and $(CH_3)_3SiO_\frac{1}{2}$ units wherein the ratio of the $SiO_2$ units to the $(CH_3)_3SiO_\frac{1}{2}$ units is in the range of 1:0.6 to 1:1.2, (IV) 25 to 70 (preferably 30 to 40) percent by weight of a solvent in which (III) is soluble, and (V) 0.25 to 5 (preferably 2 to 3) percent by weight of a titanate having the general formula $Ti(OR')_4$ wherein R' is an aliphatic hydrocarbon or a hydroxylated aliphatic hydrocarbon radical containing from 1 to 12 carbon atoms.

One of the essential ingredients in the above compositions is a carboxy functional siloxane fluid of the general formula $(CH_3)_3SiO\{(CH_3)_2SiO\}_x\{(CH_3)RSiO\}_ySi(CH_3)_3$. In its broadest meaning, R can be any carboxy functional radical containing a COOH group and which is attached to the silicon atom by a silicon-to-carbon (Si—C) bond. So far as is known at this time, these two characteristics are the only essential ones for this invention. A preferred embodiment of R is when the carboxy functional radical has the formula HOOC—Q— wherein Q is a divalent linking group attached to the silicon atom by an Si—C bond and is composed of carbon and hydrogen atoms, or carbon, hydrogen and sulfur atoms, there being from 2 to 10 carbon atoms in Q, and any sulfur atoms present are in the form of thioether linkages. Specific examples of R radicals include the $HOOCCH_2CH_2—$, $HOOCCH(CH_3)CH_2—$, $HOOC(CH_2)_6—$, $HOOC(CH_2)_{18}—$, $HOOCCH_2SCH_2CH_2—$, $HOOCCH_2OCH_2CH_2—$ and $HOOC-C_6H_4-S-C_6H_4—$.

The number of dimethylsiloxane units in the carboxy functional siloxane is defined by x in the above formula and can range from 25 to 400, but preferably ranges from 75 to 125. In a like manner the number of $(CH_3)RSiO$ units is defined by y in the above formula and can range from 2 to 25, and preferably ranges from 2 to 10. So far as is known at this time, the viscosity of the carboxy functional siloxane is not critical and any such fluid siloxane can be employed. Obviously, the more viscous fluids can be more difficult to apply to a substrate, but this can be compensated for to a large degree by the amount of solvent used.

Another essential ingredient in the above compositions is a titanate having the general formula Ti(OR')$_4$. The R' radical can be any aliphatic hydrocarbon radical or any hydroxylated aliphatic hydrocarbon radical containing from 1 to 12 carbon atoms. Thus R' can be, for example, a methyl, ethyl, isopropyl, butyl, 2-ethylhexyl, decyl, dodecyl, octylene glycolyl, ethylene glycolyl or hexylene glycolyl radical. The R' groups can be the same or mixed.

As a general rule it should be remembered that as the amount of titanate used increases, the gel time of the composition increases and its pot life or useful length of time decreases.

A third essential ingredient in the above compositions is a trimethylsilyl endblocked polydimethylsiloxane fluid having a viscosity in the range of 20 to 100,000 centistokes at 25° C. Preferably these siloxane fluids have a viscosity in the range of 50 to 10,000 centistokes. Such siloxane fluids are well known throughout industry and are commercially available from a variety of sources.

Still another component essential to the compositions set forth above is a siloxane composed of SiO$_2$ units and (CH$_3$)$_3$SiO$_{\frac{1}{2}}$ units wherein the ratio of the SiO$_2$ units to the (CH$_3$)$_3$SiO$_{\frac{1}{2}}$ units is in the range of 1:0.6 to 1:1.2. As with the trimethylsilyl endblocked polydimethylsiloxane fluids, supra, these siloxanes are well known materials.

A final essential component for the compositions of this invention is a solvent. When a siloxane composed of the SiO$_2$ and (CH$_3$)$_3$SiO$_{\frac{1}{2}}$ units is present in the composition, the solvent employed must be one in which this siloxane is soluble. Since this siloxane is produced in a solvent solution, the siloxane as made can serve as the source of the solvent for the compositions of this invention. Also, the solvent and the amount of solvent in the compositions can be controlled by removal or addition of solvent by obvious techniques to achieve the desired level in the final composition. Specific examples of the organic solvents useful herein include benzene, toluene, xylene, trimethylpentanediol isobutyrate, perchloroethylene, Stoddard solvent and naphtha mineral spirits. Generally speaking the hydrocarbon solvents are preferred.

So far as is known at this time, the best method for preparing the compositions of this invention is to first mix the titanate and solvent and then to mix in the carboxy functional siloxane and/or other ingredients. Other orders of mixing can be used but tend to cause the formation of gels.

The use of the above compositions in the process of this invention can be accomplished in a relatively simple and straightforward manner. The process involves applying the composition to the metal substrate which will be coming in contact with the molten sulfur and then drying the composition. In this manner it is believed that the metal substrate is altered in some manner as by the deposition of a film thereon whereby the release of the sulfur therefrom is facilitated. The compositions can be applied to the metal substrate by any manner convenient to the user such as by spraying, brushing, dipping, flooding or wiping the composition thereon. Likewise, drying can be accomplished in any convenient manner as by simple air-drying (e.g. standing), by blowing air or other dry gas over the surface, or by heating to speed up the drying process. The amount of the composition applied to the substrate is not critical except in so far as enough must be applied to achieve the degree of improved release of the sulfur from the substrate that the processor desires. Obviously there will be a maximum amount which can be applied beyond which no additional benefit can be seen and to use more would be wasteful.

Now in order that those skilled in the art may better understand how the present invention can be practiced, the following examples are given by way of illustration and not by way of limitation. All parts and percents given herein are by weight, and all viscosities measured at 25° C., unless otherwise specified.

Spatula Release Test

In the following examples the various compositions described were evaluated for release characteristics using the following test procedure. A clean stainless steel spatula blade is dipped into the composition to be tested and the composition allowed to air dry on the blade at room temperature. The spatula blade is then laid flat on a table and a metal washer laid flat on top of the blade. Molten sulfur is then poured into the 9/16 inch diameter hole (center) of the washer filling it, and then the sulfur is allowed to solidify. A wire attached to a spring gauge (0-2000 g) is hooked thru a hole which has previously been drilled in the rim of the washer. The spring gauge is then used to pull the sulfur (and washer) from the spatula, the pulling being done horizontally in a direction parallel to the surface of the spatula blade. This process is repeated to determine the number of times (releases) that a force of 1000 g. or less is required to release the sulfur from the spatula blade when the blade has been coated only once with the composition being tested. Crosshairs drawn on both the spatula blade and washer aid in positioning the washer in the same spot for the repeated tests in a series. When no coating is applied to the spatula blade in this test, a force of about 1500 g. to release the sulfur is required.

EXAMPLE 1

The following compositions were prepared for evaluation in the above described spatula release test. Compositions 1, 2, 3, 11, 12, and 13 were included for purposes of comparison while the other compositions represent various aspects of the invention.

(1) A trimethylsilyl endblocked polydimethylsiloxane fluid having a viscosity of 20 cs.

(2) A carboxy functional siloxane fluid having the average general formula (CH$_3$)$_3$SiO{(CH$_3$)$_2$SiO}$_{46}${(CH$_3$)-(HOOCCH$_2$SCH$_2$CH$_2$)SiO}$_2$Si(CH$_3$)$_3$ (3) A composition consisting essentially of about 79 percent of a trimethylsilyl endblocked polydimethylsiloxane fluid having a viscosity of 100 cs., about 10.5 percent of a siloxane composed of SiO$_2$ units and (CH$_3$)$_3$SiO$_{\frac{1}{2}}$ units in which the ratio of the SiO$_2$ units to the (CH$_3$)$_3$SiO$_{\frac{1}{2}}$ units was in the range of 1:0.6 to 1:1.2, and about 10.5 percent of xylene.

(4) A composition consisting essentially of about 20 g. of a carboxy functional siloxane fluid having the average formula (CH$_3$)$_3$SiO{(CH$_3$)$_2$SiO}$_{95}${(CH$_3$)-(HOOCCH$_2$SCH$_2$CH$_2$)SiO}$_3$Si(CH$_3$)$_3$, about 20 g. of hexane, and about 0.15 g. of tetraisopropyl titanate.

(5) A composition identical to composition (4) except about 1.5 g. of the titanate was used.

(6) A composition consisting essentially of about 20 g. of composition (3), and about 0.05 g. of tetraisopropyl titanate.

(7) A composition identical to composition (6) except about 0.58 g. of the titanate was used.

(8) A composition consisting essentially of about 10 g. of the carboxy functional siloxane fluid of composition (4), about 10 g. of composition (3), about 9.3 g. of hexane, and about 0.1 g. of tetraisopropyl titanate.

(9) A composition identical to composition (8) except about 0.5 g. of the titanate was used.

(10) A composition identical to composition (8) except about 0.75 g. of the titanate was used.

(11) The carboxy functional siloxane fluid per se of composition (4).

(12) A composition consisting essentially of 20 g. of a siloxane composed of SiO$_2$ units and (CH$_3$)$_3$SiO$_{\frac{1}{2}}$ units wherein the ratio of the SiO$_2$ units to the (CH$_3$)$_3$SiO$_{\frac{1}{2}}$ units is in the range of 1:0.6 to 1:1.2 and 0.58 g. of tetraisopropyl titanate.

(13) A composition identical to composition (12) except that 0.05 g. of the titanate was used.

The results of the spatula release testing of the above compositions are set forth in the table below.

| Composition | Number of releases before 1000 g | Average of Tests |
|---|---|---|
| (1)* | 4, 7, 4 | 5 |
| (2)* | 9, 9 | 9 |
| (3)* | 13, 8 | 10.5 |
| (4) | 12, 12 | 12 |
| (5) | 15, 15 | 15 |
| (6) | 15, 17, 18 | 16.7 |
| (7) | 11, 20, 23 | 18 |
| (8) | 11, 12, 15 | 12.7 |
| (9) | 21, 24, 28 | 24.3 |
| (10) | 107 | 107 |
| (11)* | 6 | 6 |
| (12)* | 3 | 3 |
| (13)* | 2 | 2 |

*Included for comparison.

EXAMPLE 2

This example illustrates the effect of the amount of solvent and titanate used.

The following compositions were prepared and evaluated in the spatula release test.

(1) A composition consisting essentially of 20 g. of a carboxy functional siloxane fluid having the average general formula (CH$_3$)$_3$SiO{(CH$_3$)$_2$SiO}$_{95}${(CH$_3$)-(HOOCCH$_2$SCH$_2$CH$_2$)SiO}$_3$Si(CH$_3$)$_3$ 1.5 g. of tetraisopropyl titanate, and 80 g. of hexane.

(2) A composition identical to composition (1) except that 20 g. of hexane was used.

(3) A composition identical to composition (1) except that 10 g. of hexane was used.

(4) A composition identical to composition (1) except that 0.15 g. of tetraisopropyl titanate was used.

(5) A composition identical to composition (1) except that 0.15 g. of tetraisopropyl titanate and 20 g. of hexane was used.

(6) A composition identical to composition (1) except that 0.15 g. of tetraisopropyl titanate and 15 g. of hexane was used.

(7) A composition identical to composition (1) except that 0.15 g. of tetraisopropyl titanate and 10 g. of hexane was used.

(8) A composition consisting essentially of about 15.8 g. of a trimethylsilyl endblocked polydimethylsiloxane fluid having a viscosity of 100 cs., about 2.1 g. of a siloxane composed of SiO$_2$ units and (CH$_3$)$_3$SiO$_{\frac{1}{2}}$ units in which the ratio of the SiO$_2$ units to the (CH$_3$)$_3$SiO$_{\frac{1}{2}}$ units was in the range of 1:0.6 to 1:1.2, about 2.1 g. of xylene and about 1.5 g. of tetraisopropyl titanate.

(9) A composition identical to composition (8) except that 0.58 g. of the tetraisopropyl titanate was used.

(10) A composition identical to composition (8) except that 0.05 g. of the tetraisopropyl titanate was used.

(11) A composition consisting essentially of 10 g. of a carboxy functional siloxane fluid having the average general formula (CH$_3$)$_3$SiO{(CH$_3$)$_2$SiO}$_{95}${(CH$_3$)-(HOOCCH$_2$SCH$_2$CH$_2$)SiO}$_3$Si(CH$_3$)$_3$ 7.9 g. of a trimethylsilyl endblocked polydimethylsiloxane fluid having a viscosity of 100 cs., 1.05 g. of a siloxane composed of SiO$_2$ units and (CH$_3$)$_3$SiO$_{\frac{1}{2}}$ units in which the ratio of the SiO$_2$ units to the (CH$_3$)$_3$SiO$_{\frac{1}{2}}$ units was in the range of 1:0.6 to 1:1.2, 1.05 g. of xylene, 9.3 g. of hexane, and 1.05 g. of tetraisopropyl titanate.

(12) A composition identical to composition (11) except that 0.75 g. of the tetraisopropyl titanate was used.

(13) A composition identical to composition (11) except that 0.5 g. of the tetraisopropyl titanate was used.

(14) A composition identical to composition (11) except that 0.1 g. of tetraisopropyl titanate was used.

The results of the spatula release testing of the above compositions are set forth in the table below.

| Composition | Number of Releases before 1000 g. | Average of Tests |
|---|---|---|
| (1) | 2 | 2 |
| (2) | 15, 15 | 15 |
| (3) | 6, 5 | 5.5 |
| (4) | 6, 5 | 5.5 |
| (5) | 12, 12 | 12 |
| (6) | 7, 10, 8 | 8.3 |
| (7) | 19, 17, 13 | 16.3 |
| (8) | 16, 14 | 15 |
| (9) | 11, 20, 23 | 18 |
| (10) | 15, 17, 18 | 16.7 |
| (11) | (gelled) | — |
| (12) | 107 | 107 |
| (13) | 21, 24, 28 | 24.3 |
| (14) | 11, 12, 15 | 12.7 |

EXAMPLE 3

This example shows the effect of various solvents used in the compositions. The following compositions were prepared and evaluated using the spatula release test.

(1) A composition consisting essentially of 10 g. of a carboxy functional siloxane fluid having the average general formula

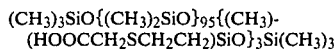

7.9 g. of a trimethylsilyl endblocked polydimethylsiloxane fluid having a viscosity of 100 cs., 1.05 g. of a siloxane composed of SiO$_2$ units and (CH$_3$)$_3$SiO$_{\frac{1}{2}}$ units wherein the ratio of the SiO$_2$ units to the (CH$_3$)$_3$SiO$_{\frac{1}{2}}$ units was in the range of 1:0.6 to 1:1.2, 1.05 g. of xylene, 20 g. of isopropyl alcohol, and 0.75 g. of tetraisopropyl titanate.

(2) A composition identical to composition (1) except that 40 g. of isopropyl alcohol was used.

(3) A composition identical to composition (1) except that hexane was used instead of isopropyl alcohol.

(4) A composition identical to composition (2) except that hexane was used instead of isopropyl alcohol.

(5) A composition consisting essentially of 20 g. of a carboxy functional siloxane fluid having the average general formula

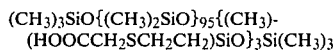

40 g. of Stoddard solvent, and 0.15 g. of tetraisopropyl titanate.

(6) A composition identical to composition (5) except that xylene was used instead of Stoddard solvent.

(7) A composition identical to composition (5) except that toluene was used instead of Stoddard solvent.

(8) A composition identical to composition (5) except that petroleum naphtha solvent (SC 140) was used instead of Stoddard solvent.

(9) A composition identical to composition (5) except that 1,1,1-trichloroethane (Chlorothene) was used instead of Stoddard solvent.

(10) A composition identical to composition (5) except that methylene chloride was used instead of Stoddard solvent and 0.12 g. of the titanate was used.

The results of the spatula release testing of the above compositions are set forth in the table below.

| Composition | Number of Releases Before 1000 g. | Average of Tests |
|---|---|---|
| (1) | 15, 17 | 16 |
| (2) | 17, 14 | 15.5 |
| (3) | 45, 97* | 71 |
| (4) | 27, 40** | 33.5 |
| (5) | 7, 8 | 7.5 |
| (6) | 6, 6 | 6 |
| (7) | 8, 8 | 8 |
| (8) | 9 | 9 |
| (9) | 14, 13 | 13.5 |
| (10) | 10 | 10 |

*In second test the spatula was recoated after the 40th release.
**In second test the spatula was recoated after the 18th release.

EXAMPLE 4

The compositions set forth below were prepared and evaluated in the spatula release test, the test results being set forth in the table following the description of the compositions.

(1) A composition consisting essentially of 20 g. of a carboxy functional siloxane fluid having the average general formula

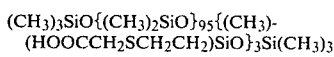

10 g. of hexane, 0.15 g. of tetraisopropyl titanate, and 3 g. of a trimethylsilyl endblocked polydimethylsiloxane fluid having a viscosity of 2000 cs.

(2) A composition identical to composition (1) except that 1.5 g. of the titanate was used.

(3) A composition identical to composition (1) except that the polydimethylsiloxane fluid had a viscosity of 10,000 cs.

(4) A composition identical to composition (1) except that 1.5 g. of the titanate was used and the polydimethylsiloxane fluid had a viscosity of 10,000 cs.

| Composition | Number of Releases Before 1000 g. | Average of Tests |
|---|---|---|
| (1) | 14, 10, 14 | 12.7 |
| (2) | 6, 11, 10 | 9 |
| (3) | 12, 10, 15 | 12.3 |
| (4) | 23, 9, 10, 16, 18, 16, 12 | 14.9 |

EXAMPLE 5

The compositions set forth below were prepared and evaluated in the spatula release test, the test results being set forth in the table following the description of the compositions. In this example, after the composition was applied to the spatula it was heated for 30–60 minutes at 100° C. to cure the coating.

(1) A composition consisting essentially of 20 g. of a carboxy functional siloxane fluid having the average general formula

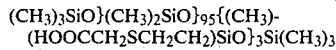

10 g. of hexane, 3 g. of a trimethylsilyl endblocked polydimethylsiloxane fluid having a viscosity of 2000 cs., and 1.5 g. of titanium acetyl acetonate (Tyzor AA).

(2) A composition identical to composition (1) except that the polydimethylsiloxane fluid had a viscosity of 10,000 cs.

(3) A composition identical to composition (1) except that 0.15 g. of the titanate was used and the polydimethylsiloxane fluid had a viscosity of 10,000 cs.

| Composition | Number of Releases Before 1000 g. | Average of Tests |
|---|---|---|
| (1) | 8, 12, 9 | 9.7 |
| (2) | 17, 10 | 13.5 |
| (3) | 11, 19, 19 | 16.3 |

EXAMPLE 6

The compositions set forth below were prepared and evaluated in the spatula release test, the test results being set forth in the table following the description of the compositions.

(1) A composition consisting essentially of about 2.86 g. of a siloxane composed of SiO$_2$ units and (CH$_3$)$_3$SiO$_{1/2}$ units wherein the ratio of SiO$_2$ units to the (CH$_3$)$_3$SiO$_{1/2}$ units was in the range of 1:0.6 to 1:1.2, about 16.19 g. of a trimethylsilyl endblocked polydimethylsiloxane fluid having a viscosity of 100 cs., about 0.95 g. of xylene, and 1.8 g. of tetraisopropyl titanate.

(2) A composition identical to composition (1) except that 0.96 g. of the titanate was used.

(3) A composition identical to composition (1) except that 0.7 g. of the titanate was used. (4) A composition consisting essentially of 10 g. of a carboxy functional siloxane fluid having the average general formula

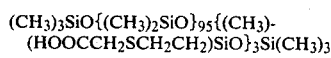
(CH₃)₃SiO{(CH₃)₂SiO}₉₅{(CH₃)-
(HOOCCH₂SCH₂CH₂)SiO}₃Si(CH₃)₃ about 1.43 g. of a siloxane composed of SiO₂ units and (CH₃)₃SiO₁/₂ units wherein the ratio of the SiO₂ units to the (CH₃)₃SiO₁/₂ units was in the range of 1:0.6 to 1:1.2, about 8.1 g. of a trimethylsilyl endblocked polydimethylsiloxane fluid having a viscosity of 100 cs., about 0.48 g. of xylene, 40 g. of hexane, and 0.9 g. of tetraisopropyl titanate.
(5) A composition identical to composition (4) except that 20 g. of hexane was used.
(6) A composition identical to composition (4) except that 20 g. of hexane and 0.75 g. of the titanate were used.

| Composition | Number of Releases Before 1000 g. | Average of Tests |
|---|---|---|
| (1) | 14, 10, 11 | 11.7 |
| (2) | 19, 11 | 15 |
| (3) | 15, 12 | 13.5 |
| (4) | 12, 15 | 13.5 |
| (5) | 26, 24 | 25 |
| (6) | 17 | 17 |

EXAMPLE 7

This example illustrates the effect of crosslinking agents other than a titanate in the compositions and process of this invention and is included for purposes of comparison. The compositions set forth below were prepared and evaluated in the spatula release test, the test results being set forth in the table following the description of the compositions.
(1) A composition consisting essentially of 20 g. of a carboxy functional siloxane fluid having the average general formula

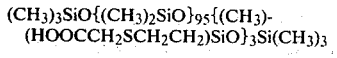
(CH₃)₃SiO{(CH₃)₂SiO}₉₅{(CH₃)-
(HOOCCH₂SCH₂CH₂)SiO}₃Si(CH₃)₃ and 40 g. of hexane.
(2) A composition identical to composition (1) except that it also contained 0.14 g. of zinc octoate.
(3) A composition identical to composition (1) except that it also contained 0.16 g. of tin (stannous) octoate.
(4) A composition identical to composition (1) except that it also contained 0.032 g. of zinc oxide.

| Composition | Number of Releases Before 1000 g. | Average of Tests |
|---|---|---|
| (1)* | 8, 8 | 8 |
| (2)* | 8, 11 | 9.5 |
| (3)* | 12, 12 | 12 |
| (4)* | 9, 11 | 10 |
| (2)** | 9 | 9 |
| (3)** | 11 | 11 |
| (4)** | 12 | 12 |

*Composition coated on spatula immediately after preparation.
**Composition coated on spatula 24 hours after preparation.

EXAMPLE 8

This example illustrates the effect of including a filler in the compositions and processes of this invention and is included for purposes of comparison. The compositions set forth below were prepared and evaluated in the spatula release test, the test results being set forth in the table following the description of the composition.
(1) A composition consisting essentially of about 18.2 g. of a carboxy functional siloxane fluid having the average general formula

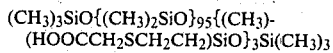
(CH₃)₃SiO{(CH₃)₂SiO}₉₅{(CH₃)-
(HOOCCH₂SCH₂CH₂)SiO}₃Si(CH₃)₃ about 1.8 g. of 5 micron Minusil silica, and 40 g. of hexane.
(2) A composition identical to composition (1) except that it also contained 0.15 g. of tetraisopropyl titanate.

| Composition | Number of Releases before 1000 g. |
|---|---|
| (1) | 13 |
| (2) | 9 |

EXAMPLE 9

This example illustrates the effect of crosslinking agents other than a titanate in the compositions and process of this invention and is included for purposes of comparison. The compositions set forth below were prepared and evaluated in the spatula release test.
(1) A composition consisting essentially of 20 g. of a carboxy functional siloxane fluid having the average general formula

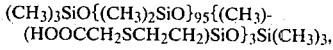
(CH₃)₃SiO{(CH₃)₂SiO}₉₅{(CH₃)-
(HOOCCH₂SCH₂CH₂)SiO}₃Si(CH₃)₃, 20 g. of hexane, and 0.7 g. of dibutyltindiacetate.
(2) A composition identical to composition (1) except that 0.76 g. of zirconium acetyl acetonate was used instead of the tin compound.
(3) A composition consisting essentially of 20 g. of the carboxy functional siloxane fluid of composition (1) and 10 g. of hexane.

Each of the above compositions gave 11 releases in the spatula release test.

That which is claimed is:

1. In a process for processing sulfur which process includes the steps of placing molten sulfur on a metal substrate, cooling the molten sulfur until it solidifies, and then subsequently releasing the solidified sulfur from the substrate, the improvement comprising, prior to the placement of the molten sulfur on the substrate, placing on the metal substrate a composition consisting essentially of
(1) 15 to 70 percent by weight of a carboxy functional siloxane fluid having the general formula

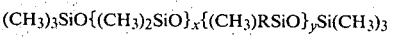
(CH₃)₃SiO{(CH₃)₂SiO}ₓ{(CH₃)RSiO}ᵧSi(CH₃)₃ wherein R is a carboxy functional radical attached to the silicon atom by an Si—C bond, x has an average value of from 25 to 400, and y has an average value of from 2 to 25,
(2) 0.1 to 5 percent by weight of a titanate having the general formula Ti(OR')₄ wherein R' is an aliphatic hydrocarbon or a hydroxylated aliphatic hydrocarbon radical containing from 1 to 2 carbon atoms, and (3) 25 to 80 percent by weight of a solvent; and then drying said composition on the metal substrate whereby the release of the solidified sulfur from the substrate is enhanced.

2. A process as defined in claim 1 wherein (1) is 40 to 60 percent, (2) is 0.25 to 0.75 percent, and (3) is 40 to 60 percent.

3. A process as defined in claim 2 wherein in
(1) R is a radical of the formula HOOC—Q— wherein Q is a divalent linking group attached to the silicon atom by an Si—C bond and is composed of carbon and hydrogen atoms or carbon, hydrogen and sulfur atoms, there being from 2 to 10 carbon atoms in Q, and any sulfur atoms present are in the form of thioether linkages; x has an average value of from 75 to 125, and y has an average value of from 2 to 10; in
(2) R' is an aliphatic hydrocarbon radical, and
(3) is a hydrocarbon solvent.

4. A process as defined in claim 3 wherein
(1) has the general formula (CH$_3$)$_3$SiO{(CH$_3$)$_2$SiO}$_{95}${(CH$_3$)(HOOCCH$_2$SCH$_2$CH$_2$)SiO}$_3$Si(CH$_3$)$_3$ (2) is tetraisopropyl titanate, and
(3) is hexane.

5. In a process for processing sulfur which process includes the steps of placing molten sulfur on a metal substrate, cooling the molten sulfur until it solidifies, and then subsequently releasing the solidified sulfur from the substrate, the improvement comprising, prior to the placement of the molten sulfur on the substrate, placing on the metal substrate a composition consisting essentially of
(A) 70 to 85 percent by weight of a trimethylsilyl endblocked polydimethylsiloxane fluid having a viscosity in the range of 20 to 100,000 centistokes at 25° C.,
(B) 5 to 15 percent by weight of a siloxane composed of SiO$_2$ units and (CH$_3$)$_3$SiO$_{1/2}$ units wherein the ratio of the SiO$_2$ units to the (CH$_3$)$_3$SiO$_{1/2}$ units is in the range of 1:0.6 to 1:1.2,
(C) 3 to 20 percent by weight of a solvent in which (B) is soluble, and
(D) 0.1 to 10 percent by weight of a titanate having the general formula Ti(OR')$_4$ wherein R' is an aliphatic hydrocarbon or a hydroxylated aliphatic hydrocarbon radical containing from 1 to 12 carbon atoms; and then drying said composition on the metal substrate whereby the release of the solidified sulfur from the substrate is enhanced.

6. A process as defined in claim 5 wherein (A) is 75 to 80 percent, (B) is 9 to 12 percent, (C) is 8 to 12 percent, and (D) is 0.2 to 0.5 percent.

7. A process as defined in claim 6 wherein (A) has a viscosity in the range of 50 to 10,000 centistokes, (C) is a hydrocarbon solvent, and in (D) R' is an aliphatic hydrocarbon radical.

8. A process as defined in claim 7 wherein (A) has a viscosity of about 100 centistokes, (C) is xylene, and (D) is tetraisopropyl titanate.

9. In a process for processing sulfur which process includes the steps of placing molten sulfur on a metal substrate, cooling the molten sulfur until it solidifies, and then subsequently releasing the solidified sulfur from the substrate, the improvement comprising, prior to the placement of the molten sulfur on the substrate, placing on the metal substrate a composition consisting essentially of
(I) 15 to 40 percent by weight of a carboxy functional siloxane fluid having the general formula (CH$_3$)$_3$SiO{(CH$_3$)$_2$SiO}$_x${(CH$_3$)RSiO}$_y$Si(CH$_3$)$_3$ wherein R is a carboxy functional radical attached to the silicon atom by an Si—C bond, x has an average value of from 25 to 400, and y has an average value of from 2 to 25,
(II) 10 to 35 percent by weight of a trimethylsilyl endblocked polydimethylsiloxane fluid having a viscosity in the range of 20 to 100,000 centistokes at 25° C.,
(III) 2 to 5 percent by weight of a siloxane composed of SiO$_2$ units and (CH$_3$)$_3$SiO$_{1/2}$ units wherein the ratio of the SiO$_2$ units and (CH$_3$)$_3$SiO$_{1/2}$ units is in the range of 1:0.6 to 1:1.2,
(IV) 25 to 70 percent by weight of a solvent in which (III) is soluble, and
(V) 0.25 to 5 percent by weight of a titanate having the general formula Ti(OR')$_4$ wherein R' is an aliphatic hydrocarbon or a hydroxylated aliphatic hydrocarbon radical containing from 1 to 12 carbon atoms; and then drying said composition on the metal substrate whereby the release of the solidified sulfur from the substrate is enhanced.

10. A process as defined in claim 9 wherein (I) is 30 to 35 percent, (II) is 20 to 30 percent, (III) is 3 to 4 percent, (IV) is 30 to 40 percent, and (V) is 2 to 3 percent.

11. A process as defined in claim 10 wherein in (I) R is a radical of the formula HOOC—Q— wherein Q is a divalent linking group attached to the silicon atom by an Si—C bond and is composed of carbon and hydrogen atoms or carbon, hydrogen and sulfur atoms, there being from 2 to 10 carbon atoms in Q, and any sulfur atoms present are in the form of thioether linkages; x has an average value of from 75 to 125, and y has an average value of from 2 to 10; (II) has a viscosity in the range of 50 to 10,000 centistokes; (IV) is a hydrocarbon solvent; and in (V) R' is an aliphatic hydrocarbon radical.

12. A process as defined in claim 11 wherein (I) has the general formula (CH$_3$)$_3$SiO{(CH$_3$)$_2$SiO}$_{95}${(CH$_3$)(HOOCCH$_2$SCH$_2$CH$_2$)SiO}$_3$Si(CH$_3$)$_3$ (II) has a viscosity of about 100 centistokes,
(IV) is a mixture of hexane and xylene, and
(V) is tetraisopropyl titanate.

13. A composition consisting essentially of
(1) 15 to 70 percent by weight of a carboxy functional siloxane fluid having the general formula (CH$_3$)$_3$SiO{(CH$_3$)$_2$SiO}$_x${(CH$_3$)RSiO}$_y$Si(CH$_3$)$_3$ wherein R is a carboxy functional radical attached to the silicon atom by an Si—C bond, x has an average value of from 25 to 400, and y has an average value of from 2 to 25,
(2) 0.1 to 5 percent by weight of a titanate having the general formula Ti(OR')$_4$ wherein R' is an aliphatic hydrocarbon or a hydroxylated aliphatic hydrocarbon radical containing from 1 to 12 carbon atoms, and
(3) from 25 to 80 percent by weight of a solvent.

14. A composition as defined in claim 13 wherein (1) is 40 to 60 percent, (2) is 0.25 to 0.75 percent, and (3) is 40 to 60 percent.

15. A composition as defined in claim 14 wherein in (1) R is a radical of the formula HOOC—Q— wherein Q is a divalent linking group attached to the silicon atom by an Si—C bond and is composed of carbon and hydrogen atoms or carbon, hydrogen and sulfur atoms, there being from 2 to 10 carbon atoms in Q, and any sulfur atoms present are in the form of thioether linkages; x has an average value of from 75 to 125, and y has an average value of from 2 to 10; in (2) R' is an aliphatic hydrocarbon radical; and (3) is a hydrocarbon solvent.

16. A composition as defined in claim 15 wherein in (1) Q is composed of carbon, hydrogen, and sulfur atoms, in (2) R' is an alkyl radical, and (3) is an aliphatic hydrocarbon solvent.

17. A composition as defined in claim 16 wherein (1) is about 49.8 percent and has the general formula $(CH_3)_3SiO\{(CH_3)_2SiO\}_{95}\{(CH_3)(HOOCCH_2SCH_2CH_2)SiO\}_3Si(CH_3)_3$ (2) is about 0.4 percent and R' is an isopropyl radical, and
(3) is about 49.8 percent and is hexane.

18. A composition consisting essentially of
(I) 15 to 40 percent by weight of a carboxy functional siloxane fluid having the general formula $(CH_3)_3SiO\{(CH_3)_2SiO\}_x\{(CH_3)RSiO\}_ySi(CH_3)_3$ wherein R is a carboxy functional radical attached to the silicon atom by an Si—C bond, x has an average value of from 25 to 400 y has an average value of from 2 to 25,
(II) 10 to 35 percent by weight of a trimethylsilyl endblocked polydimethylsiloxane fluid having a viscosity in the range of 20 to 100,000 centistokes at 25° C.,
(III) 2 to 5 percent by weight of a siloxane composed of $SiO_2$ units and $(CH_3)_3SiO_{1/2}$ units wherein the ratio of the $SiO_2$ units to the $(CH_3)_3SiO_{1/2}$ units is in the range of 1:0.6 to 1:1.2,
(IV) 25 to 70 percent by weight of a solvent in which (III) is soluble, and
(V) 0.25 to 5 percent by weight of a titanate having the general formula $Ti(OR')_4$ wherein R' is an aliphatic hydrocarbon or a hydroxylated aliphatic hydrocarbon radical containing from 1 to 12 carbon atoms.

19. A composition as defined in claim 18 wherein (I) is 30 to 35 percent, (II) is 20 to 30 percent, (III) is 3 to 4 percent, (IV) is 30 to 40 percent, and (V) is 2 to 3 percent.

20. A composition as defined in claim 19 wherein in (I) R is a radical of the formula HOOC—Q— wherein Q is a divalent linking group attached to the silicon atom by an Si—C bond and is composed of carbon and hydrogen atoms or carbon, hydrogen and sulfur atoms, there being from 2 to 10 carbon atoms in Q, and any sulfur atoms present are in the form of thioether linkages; x has an average value of from 75 to 125, and y has an average value of from 2 to 10; (II) has a viscosity in the range of 50 to 10,000 centistokes; (IV) is a hydrocarbon solvent; and in (V) R' is an aliphatic hydrocarbon radical.

21. A composition as defined in claim 20 wherein in (I) Q is composed of carbon, hydrogen and sulfur atoms, (IV) is a mixture of aliphatic and aromatic hydrocarbon solvents, and in (V) R' is an alkyl radical.

22. A composition as defined in claim 21 wherein (I) is about 33.3 percent and has the general formula $(CH_3)_3SiO\{(CH_3)_2SiO\}_{95}\{(CH_3)(HOOCCH_2SCH_2CH_2)SiO\}_3Si(CH_3)_3$ (II) is about 26.3 percent and has a viscosity of about 100 centistokes, (III) is about 3.5 percent, (IV) is about 34.4 percent and is composed of hexane and xylene in a ratio of about 9 parts by weight of hexane for each 1 part by weight of xylene, and
(V) is about 2.5 percent and R' is an isopropyl radical.

* * * * *

UNITED STATES PATENT AND TRADEMARK OFFICE
CERTIFICATE OF CORRECTION

PATENT NO. : 4,248,825

DATED : February 3, 1981

INVENTOR(S) : Delbert L. Coon, et al.

It is certified that error appears in the above-identified patent and that said Letters Patent are hereby corrected as shown below:

Column 8, Example 5, the formula on lines 33 and 34 should read as follows:

$(CH_3)_3SiO\{(CH_3)_2SiO\}_{95}\{(CH_3)(HOOCCH_2SCH_2CH_2)SiO\}_3Si(CH_3)_3$

Claim 1, in the paragraph numbered 2, the fourth line reading "radical containing from 1 to 2 carbon atoms," should read --radical containing from 1 to 12 carbon atoms,-- .

Signed and Sealed this

Twenty-sixth Day of May 1981

[SEAL]

Attest:

RENE D. TEGTMEYER

Attesting Officer    Acting Commissioner of Patents and Trademarks